No. 859,042. PATENTED JULY 2, 1907.
H. BÖGELMANN.
TEDDING MACHINE.
APPLICATION FILED NOV. 10, 1904.

WITNESSES:
Paul Lange.
Carl Krehan

INVENTOR:
Hermann Bögelmann

UNITED STATES PATENT OFFICE.

HERMANN BÖGELMANN, OF CREFELD, GERMANY.

TEDDING-MACHINE.

No. 859,042.     Specification of Letters Patent.     Patented July 2, 1907.

Application filed November 10, 1904. Serial No. 232,207.

*To all whom it may concern:*

Be it known that I, HERMANN BÖGELMANN, dairy-keeper, a subject of the German Emperor, and a resident of 191 Juratherstrasse, in Crefeld, in the Kingdom of Prussia, German Empire, have invented certain new and useful Improvements in Tedding-Machines, of which the following is a specification.

My invention relates to an improved machine for tedding, or scattering hay, so as to loosen it and expose it to the sun and air.

According to my invention I employ forks, tines, teeth or the like arranged, with a certain degree of resilience, on guiding or carrying means somewhat in the manner of the chain of buckets in a dredging— or elevating—machine, or the like. As guiding or carrying means, endless-chains or the like may be used, to which the forks or tines are secured at intervals, for example by means of horizontal bars, which may be so disposed as to connect the chains. The latter may run in vertical or inclined direction over sprocket-wheels mounted on two parallel shafts and driven by suitable means from the axle or traveling-wheels of the machine. Suitable gear is also provided for throwing the tedding-mechanism into and out of operation as required. The chains and forks or tines may be provided in any desired number and located both inside and outside the traveling-wheels. I also employ suitable gear, preferably operable from the driver's perch, whereby the tedding-gear may be raised or lowered when circumstances render this desirable.

By means of the new machine the hay is loosened turned or scattered in quite the same manner as this is effected by an ordinary hand-fork. For the lowermost tines or forks, that is, those which are for the time being operative, like the lowermost buckets of a chain, move with an accelerated circumferential velocity, and, owing to their resilient attachment to the carrying members, on striking the hay, vibrate, which motion very closely resembles the effect attained when an ordinary hand hay-fork is shaken.

In the well-known cylinder-tedders, the hay, especially when wet, frequently winds onto the drum. This is impossible in the present machine, which picks up and turns damp hay most effectively. By arranging tines or forks closely adjacent to the traveling-wheels, and on each side thereof, hay which is crushed down by the wheels can be lifted and turned equally with the looser lying hay which is another essential advantage of my machine over ordinary tedders.

The construction of the machine is exceedingly simple, so that no special skill is required to manage it.

Figure 1:
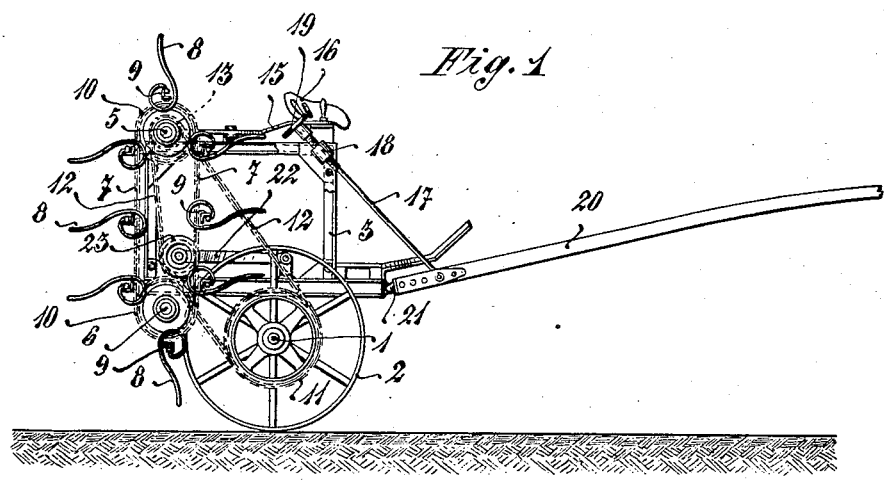
Figure 2:
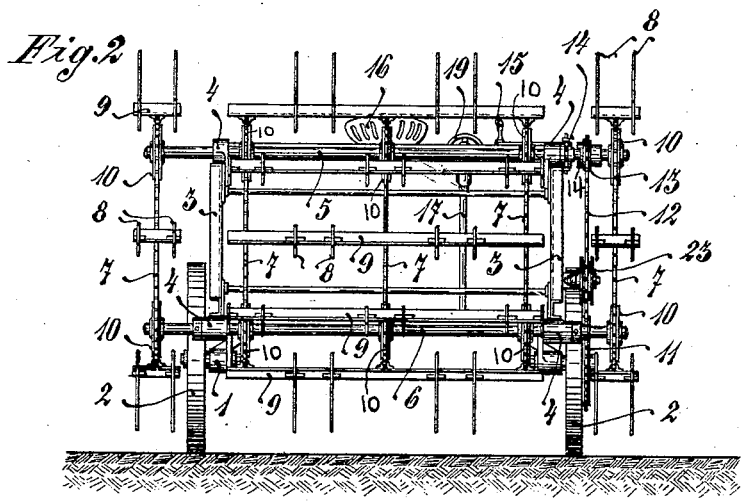

One form of construction of the new machine is shown in the accompanying drawing, in which Figure 1 is a side elevation and Fig. 2 a rear elevation.

1 is the axle, 2 the traveling-wheels and 3 the frame of the machine. The projecting rear ends of the frame are provided with suitable bearings 4 to receive shafts 5, 6. The latter carry a number of sprocket-wheels 10, the chains 7 of which carry the bars 9 provided with forks or tines 8.

For the chains lying between the wheels 2, I prefer to provide common bars 9 extending across from one wheel to the other, and to dispose the forks of one bar with certain lateral displacement relatively to those of the next, as shown in Fig. 2, but naturally I do not limit myself to such construction. There may, as already stated, be any desired number of sprocket-wheels and forks. When a great width of machine is not desirable, the chain-gear beyond, or outside of the traveling-wheels 2 may, of course, be dispensed with. In general, it will be found advantageous to locate chains and forks in the immediate proximity of each side of the wheels 2, so that hay which is pressed down by the latter may be effectually loosened and scattered.

The forks or tines may be of any desired form and secured in any suitable manner, but in any case the arrangement should be such as to admit of a certain amount of resilience. In the drawing tines are shown, the base of which is wound round in a more or less spiral manner, whereby very considerable elasticity is insured.

The motion of the wheels 2 may be transmitted to the tedding-apparatus by means of any suitable gearing. In the drawings a sprocket-wheel 11 is shown for this purpose, connected positively with the right traveling-wheel 2, and a chain 12 runs over the wheel 11 and a second sprocket-wheel 13, mounted on the shaft 5.

14, 14 are two clutch-halves, brought into coöperation by the lever 15 actuated from the driver's seat 16, whereby the tedding-gear can be thrown into and out of operation as desired. Any other suitable clutch mechanism, other than that shown, may be employed.

For the purpose of enabling the tedding-apparatus to be adjusted vertically to suit the character of the land, or to clear the roadway, or obstacles lying thereon, when the machine is being driven from one field to another place of work, suitable gear should be provided. This may consist of a rod 17, the upper end of which is provided with a hand-wheel 19 and works in a screw-socket or bracket 18 secured to the frame 3 near the driver's perch 16. The lower end of the rod 17 is jointed with capability of turning, to the shafts 20, jointed at 21 to the frame 3. If, then, the wheel 19 is turned to the right or left, the portion of the rod 17 located between the shaft 20 and frame 3 is shortened or lengthened. The shafts being held down in traveling, the frame 3 will therefore either be caused to approach the shafts, by turning about the axle 1 as center, the tedding gear being thus raised; or the frame 3 will move from the shafts, whereby the tedding-gear will be lowered. In order that the chain 12 may always be maintained in a state of tension, an arm 22 is jointed to the frame, having at its free end a grooved pulley 23 which bears upon the chain 12 by gravity.

It must be clearly understood, that although I have described in detail one particular construction of machine according to my invention, I do not in any way desire to limit myself to such constructional details, but claim as new:—

In a tedding-machine, in combination, shafts mounted in the machine frame and extending beyond the traveling wheels, endless traveling members carried thereby, bars secured to the said members, resilient tedding-devices carried by the bars both between the traveling wheels and outside the latter, gear for transmitting the motion of the wheels of the machine to the traveling members, and gear for engaging and disengaging the tedding apparatus, substantially as described.

In witness whereof I have hereunto signed my name this 27th day of October 1904, in the presence of two subscribing witnesses.

HERMANN BÖGELMANN.

Witnesses:
 H. ENDEPOLS,
 W. BRUCE WALLACE.